United States Patent [19]
Dijon et al.

[11] Patent Number: 5,138,473
[45] Date of Patent: Aug. 11, 1992

[54] FERROELECTRIC LIQUID CRYSTAL SCREEN WITH LOCALIZED ZIGZAG DEFECTS AND OPACIFIED ELECTRODES IN THE NON-SWITCHABLE AREA OF THE SCREEN AND PROCESSES FOR OBTAINING SPACERS AND TREATING SAID SCREEN

[75] Inventors: Jean Dijon, Le Pont de Claix; Christine Ebel, Grenoble; Aimé Perrin, St. Ismier, all of France

[73] Assignee: Commissariat a l'Energie Atomique, Paris, France

[21] Appl. No.: 735,193

[22] Filed: Jul. 24, 1991

[30] Foreign Application Priority Data

Jul. 20, 1987 [FR] France .............................. 87 10215
Jul. 20, 1988 [WO] PCT Int'l Appl. ... PCT/FR88/00375

[51] Int. Cl.⁵ .................. G02F 1/1335; G02F 1/1339; G02F 1/13
[52] U.S. Cl. ...................................... 359/67; 359/100; 359/81
[58] Field of Search ................... 350/337, 339 R, 344, 350/350 S, 340, 341; 359/62, 67, 79, 81, 100

[56] References Cited

U.S. PATENT DOCUMENTS

| | | | |
|---|---|---|---|
| 4,568,149 | 2/1986 | Sugata et al. | 350/334 |
| 4,653,864 | 3/1987 | Baron et al. | 350/344 |
| 4,668,051 | 5/1987 | Mourey et al. | 350/350 S |
| 4,720,173 | 1/1988 | Okada et al. | 350/341 |
| 4,725,176 | 3/1988 | Tsuboyama et al. | 350/350 S |
| 4,725,517 | 2/1988 | Nakanowatari et al. | 350/340 X |
| 4,763,995 | 8/1988 | Katagiri et al. | 350/341 |
| 4,775,225 | 10/1988 | Tsuboyama et al. | 350/344 |
| 4,842,377 | 6/1989 | Nakanowatari | 350/344 |
| 4,879,059 | 11/1989 | Hanyu et al. | 350/340 X |
| 4,904,056 | 2/1990 | Castleberry | 350/333 |
| 4,932,758 | 6/1990 | Hanyu et al. | 350/350 S |

FOREIGN PATENT DOCUMENTS 0324433 7/1989 European Pat. Off. ......... 350/350 S Primary Examiner—Stanley D. Miller
Assistant Examiner—Ron Trice
Attorney, Agent, or Firm—Nilles & Nilles

[57] ABSTRACT

Ferroelectric liquid crystal screen with opacified electrodes in the non-switchable area of the screen and processes for obtaining spacers and treating said screen.

On each part of each row or column electrode of the screen, facing a gap separating two column or row electrodes is arranged an element (40,50) preventing the passage through the screen of light reaching the latter in the direction of the element. The elements located on the row electrodes (32) or those located on the column electrodes (34) also permit the spacing, without electrical connection, of the screen plates and the localization of the zigzag defects which the liquid crystal may have, in or in the vicinity of the non-switchable area of the screen. The screen is appropriately heated and an alternating voltage is applied between the electrodes in order to localize the zigzag defects of the liquid crystal in the vicinity of the spacing elements. In order to obtain the latter, it is possible to irradiate a positive resin layer through the plate intended to carry these elements and previously provided with opaque layers on the parts corresponding thereto.

16 Claims, 4 Drawing Sheets

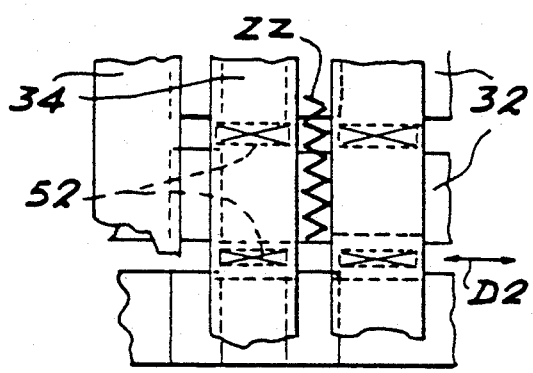
FIG. 7
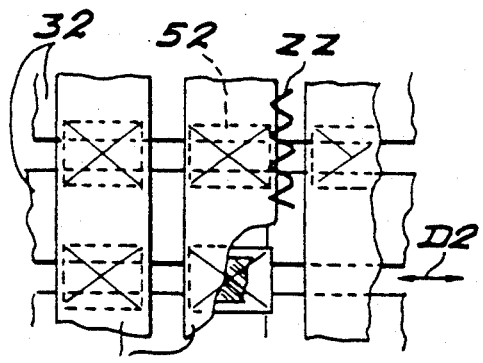
FIG. 7A
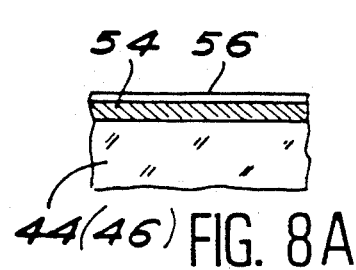
FIG. 8A
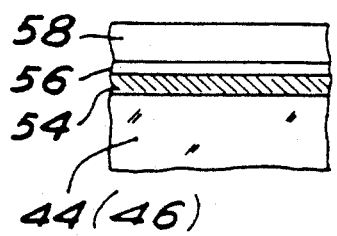
FIG. 8B
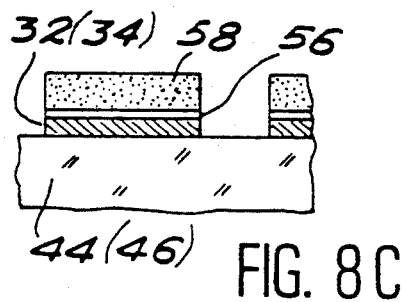
FIG. 8C
FIG. 8D
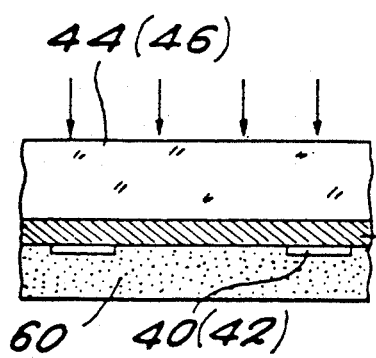
FIG. 9
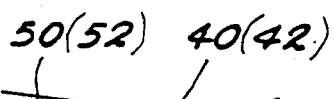
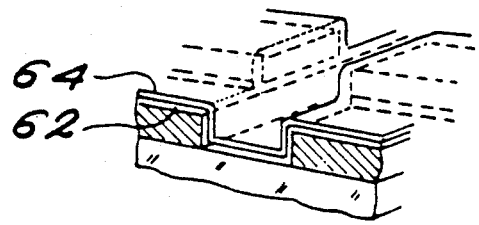
FIG. 8E

FERROELECTRIC LIQUID CRYSTAL SCREEN WITH LOCALIZED ZIGZAG DEFECTS AND OPACIFIED ELECTRODES IN THE NON-SWITCHABLE AREA OF THE SCREEN AND PROCESSES FOR OBTAINING SPACERS AND TREATING SAID SCREEN

This application is a continuation of application number 07/460,957, filed Jan. 1, 1990, now abandoned.

BACKGROUND OF THE INVENTION

The present invention relates to a ferroelectric liquid crystal screen for the display of information such as images or characters having opacified electrodes in the non-switchable area of the screen, to a process for obtaining spacers for said screen and to a process for treating the screen.

1. Field of the Invention

The invention may be practiced with tilted chiral smectic C,I,F,G or H liquid crystals and in particular with chiral smectic C phase liquid crystals.

2. Description of the Related Art

EP-A-0 032 362 describes a display means, whose electrooptical display material is a chiral smectic C phase liquid crystal. This display means, diagrammatically shown in longitudinal sectional form in FIG. 1, has a first linear polarizer 2 and a second linear polarizer 4, which cross one another and between which is inserted a light display cell 6. A light source 8 located below polarizer 4 makes it possible to illuminate cell 6.

This display cell operating in transmission is formed by two electrically insulating, transparent walls or plates 10,12, which are generally of glass. These parallel substrates are joined by their edges by a bonded joint 14 serving as a sealing joint.

Walls 10 and 11 are respectively covered by an electrode 16 and a counterelectrode 18 having a shape appropriate for the display and made from a transparent conductive material. The electrode and counterelectrode can in each case be formed by parallel conductive strips, the strips of the electrode, which will be called the column electrode and the strips of the counterelectrode which will be called the row electrodes perpendicularly cross one another.

The electrode and the counterelectrode make it possible to apply to the terminals of a chiral smectic C phase liquid crystal film 20 contained in cell 6, a continuous electric field $\vec{E}$ the direction or value of which can be modified. To this end, electrode 16 and counterelectrode 18 are connected, via an inverter 22, to a continuous electric power supply 24.

FIG. 2 shows on the molecular scale the structure of a smectic C phase liquid crystal film, when the latter is contained in display cell 6. With a view to simplifying FIG. 2, all that is shown is the cell walls 10 and 12. The lower wall 12 e.g. constitutes a reference plane containing the two axes X and Y of an orthogonal reference system XYZ.

The smectic C liquid crystal film is formed by elongated molecules 26 having a longitudinal axis 28 and arranged in layers 30. Each of these molecules has a permanent dipole moment $\bar{p}$ perpendicular to their longitudinal axis 28.

In the ideal case shown in FIG. 2, the smectic layers 30 are all parallel to one another and oriented perpendicular to the cell walls 10 and 12.

When an electric field $\vec{E}$ is applied to such a liquid crystal, a high coupling is obtained between the molecular orientation (longitudinal axis 28 of the molecules) and said electric field $\vec{E}$ due to the presence of the permanent dipole. This coupling is of the polar type, because the electric dipole is preferably oriented in a direction parallel to the electric field. The polarity change of the electric field consequently makes it possible to change the orientation of the electric dipole and therefore the orientation of the molecules 26.

FIG. 2 shows in continuous line form the molecules 26 of the liquid crystal in accordance with a first orientation $A_1$ (state 1) forming an angle $-\theta$ with respect to the direction X, the dipole moments $\bar{p}$ being oriented perpendicular to the cell walls 10,12 and in the direction of the electric field $\vec{E}$ from wall 10 to wall 12. The polarity change of the electric field permits the tilting the dipole moments $\bar{p}$ in the opposite direction (from wall 12 to wall 10) leading to a pivoting of the molecules about axis Z by an angle of $2\theta$. The second orientation $A_2$ of the molecules (state 2) is symbolized in dotted line form and forms an angle $+\theta$ with respect to direction X.

The molecules pass from the first to the second orientation and vice versa describing a cone angle at the apex $2\theta$ characteristic of the material (typically $\theta=22.5°$).

FIG. 2 also shows the respective polarization directions P and P' of the linear polarizers 2 and 4.

When these two polarizers are crossed and when in state 1 the molecules 26 of the liquid crystal are parallel to the polarization direction P' of the polarizer 4, the optical state 1 of the liquid crystal corresponds to the absorption of the light from source 8 and optical state 2 to the transmission of said same light.

The chiral smectic C phase liquid crystals when appropriately oriented (FIG. 2) can therefore be used as display materials. Apart from their bistability, they can have interesting properties, such as a fast response or switching time of approximately one microsecond for low voltages applied to the electrodes (a few volts) and a wide electrooptical response.

For the apparatus shown in FIG. 1 to operate correctly, the liquid crystal thickness must be extremely small, e.g. approximately two micrometers. The spacing of walls 10 and 12 leading to such a thickness is generally obtained by means of spacers constituted by calibrated plastic balls. These balls when used as spacers are arranged in a random manner between walls 10 and 12.

FIG. 3 shows very diagrammatically and in plan view a liquid crystal display screen comprising transparent, parallel row electrodes 32 and transparent, parallel column electrodes 34, which are perpendicular to the row electrodes.

One of the most important parameters of this screen is the contrast obtained between the displayed black state N and the white state B. This contrast is defined by the ratio of the intensity transmitted in the white state IB to the intensity transmitted in the black state IN. In order to obtain a high contrast, it is necessary for the intensity of the black state, e.g. corresponding to state 1 of the apparatus described relative to FIGS. 1 and 2, and the white state then corresponding to state 2, to be as low as possible, so as to have a large IB/IN ratio.

When the screen shown in FIG. 3 uses an e.g. chiral smectic C phase, bistable ferroelectric liquid crystal, the non-switchable area 36 of the screen contains densities substantially equal to states 1 and states 2. The switchable area 38 in FIG. 3 corresponds to all the "overlaps"

of electrodes 32 and 34 (in plan view) and that the non-switchable area (or non-addressable area) corresponds to the remainder of the screen. Thus, to obtain a good bistability, the surface treatments permitting the orientation of the liquid crystal are such that the two states are equiprobable in the non-switchable area.

The non-switchable area 36 therefore appears grey when an appropriate voltage is established between electrodes 32 and 34 and the linear polarizers are appropriately positioned on either side of the assembly or cell comprising electrodes 32, 34 (respectively placed on the generally glass, electrically insulating plates) and the liquid crystal layer.

The fact that the non-switchable area appears grey is highly prejudicial to the contrast, even if said electrooptical effect used makes it possible to obtain an excellent black state at the switchable area 38.

The dimensions of the non-switchable area cannot be significantly reduced, because for large complex screens, the efficiency of the etching operations necessary for their production impose a limit size to the non-switchable area.

This problem relating to the grey appearance of the non-switchable area is also encountered with screens using other liquid crystals. The problem in question is then solved by placing between the row electrodes and the column electrodes an opaque screen. The latter is generally made from a coloured, electrically insulating material, whose thickness is necessarily a few micrometers, e.g. 1 to 2 micrometers, in order that the insulating material is sufficiently absorbent. Such a thickness is incompatible with screens using a ferroelectric liquid crystal. Thus, the thickness of the liquid crystal layer does not permit the intersection of coloured insulating material layers arranged in gaps separating the row electrodes and the layers of said same material located in the gaps separating the column electrodes.

It would indeed be conceivable to cover the row and column electrodes with an appropriately thick electrical insulant, which would be transparent in the switchable area and opaque in the non-switchable area in order to solve this problem. However, such a technique would be very unfavourable from the screen operation standpoint, because a considerable part of the electrical energy necessary for the switching of the liquid crystal would be lost in the insulant, whose thickness would be comparable to the "active" thickness of the liquid crystal.

Another problem resulting from the use of a ferroelectric liquid crystal, e.g. a chiral smectic C phase liquid crystal, particularly in connection with the production of a large screen, is due to the presence of characteristic alignment errors that are liable to occur with such a liquid crystal. These errors are known under the name "zigzag" and are in particular referred to in the article by M. A. Handschy et al, published in Ferroelectrics, 1984, Vol. 59, pp. 69 to 116.

These defects or errors, which are in the form of lines, reduce the contrast. Moreover, their distribution can be inhomogeneous over the screen surface, which leads to an inhomogeneous appearance of the picture displayed by the screen, which is unfavourable to obtaining a good quality screen.

The density of these defects is dependent on the liquid crystal used and the surface treatments carried out on the plates between which said liquid crystal is located. One of the possible surface treatments consists of placing on each of said plates a layer of an appropriate material and to rub the said material layers either parallel to the row electrodes or parallel to the column electrodes.

It is very difficult to place the liquid crystal between surfaces of several hundreds of $cm^2$ without zigzag faults occuring. They occur perpendicular to the rubbing direction of the walls and tend to attach themselves to the balls used as spacers and which stop these defects. However, these balls are distributed in a random manner between the screen plates and in particular in the switchable area thereof, which leads to a poor contrast in a durable manner for such a known ferroelectric liquid crystal screen.

SUMMARY OF THE INVENTION

An object of the present invention is to improve the contrast of a ferroelectric liquid crystal screen, e.g. a screen using a tilted chiral smectic C liquid crystal, by opacifying in a special manner the non-switchable area of the screen and by forcing the zigzag faults into the non-switchable area of the screen or into the vicinity thereof.

Specifically, the present invention firstly relates to a ferroelectric liquid crystal screen comprising an assembly having a ferroelectric liquid crystal layer able to have zigzag faults, said layer being located between a group of transparent row electrodes, which are parallel to one another and separated from one another and a group of transparent column electrodes, which are parallel to one another and separated from one another and perpendicular to the row electrodes, said electrode groups being respectively located on two electrically insulating and transparent plates, characterized in that the screen also comprises, on each part of each row electrode facing a gap separating two column electrodes, and on each part of each column electrode facing a gap separating two row electrodes, an element serving to prevent the passage through the screen of light reaching said screen in the direction of said element and in that the elements placed on the row electrodes, or the elements placed on the column electrodes also serve to permit the spacing, without any electrical connection between the row electrodes and the column electrodes, of the screen plates and having sizes which, counted parallel to said plates, permit the localization of the zigzag defects in the vicinity of or in the non-switchable area of the screen.

Thus, according to the present invention, said elements are located in the non-switchable area of the screen, which makes it possible to eliminate the grey appearance of said area referred to hereinbefore. The technique used in the present invention for making said non-switchable screen area opaque remains compatible with the extreme thinness of the ferroelectric liquid crystal layer used. It is pointed out in this connection that the thickness of said layer, which in fact depends on the liquid crystal used, is generally approximately 1.5 to 2 micrometers.

Moreover, as a result of the fact that the elements permitting the spacing of the plates and thus having a spacer function, are placed in the non-switchable area of the screen, the zigzag defects are no longer impeded in the switchable area of the screen and, after a varying period of use or addressing of the screen, these defects abut against the elements permitting the spacing of the plates, in the vicinity of the opacified non-switchable area. This leads to an improvement of the visual contrast without any deterioration to the other electrooptical properties of the screen (switching time, addressing time, etc).

The screen also comprises polarization means located on either side of said assembly and which can consist of two crossed linear polarizers.

According to a particular embodiment of the screen according to the invention, each element has an opaque layer covering that part of the electrode on which said element is arranged and each element permitting the spacing of the plates has, apart from said opaque layer, an electrically insulating spacer placed on the latter.

Preferably, the width of said opaque layer exceeds the width of the gap separating two electrodes and faces the part covered by said opaque layer, in order to aid the positioning of the opaque layers located on a plate with respect to the corresponding inter-electrode gaps located on the other plate and so as to mask the edge of the electrodes facing the opaque layers, said edge being able to have an imperfect switching.

Preferably, each spacer is elongated transversely with respect to the electrode on which the element having said spacer is located. This more particularly leads to an increase in the rigidity of the screen compared with the known screens which use balls as spacers.

In order not to have a positioning program between the two screen plates, the width of each spacer must exceed the width of the gap separating two electrodes and facing the part on which the element having said spacer is located.

However, preferably, in order not to have this problem, the width of each spacer is less, e.g. by half, than the width of the gap separating two electrodes and facing the part on which the element having said spacer is located. Thus, in certain cases envisaged hereinafter, it is preferable to have a minimum width for the spacers in order to hide to the greatest possible extent the zigzag defects.

According to another special embodiment of the screen according to the invention, said screen also has two crossed linear polarizers on either side of said assembly, wherein each element permitting the spacing of the plates is an electrically insulating spacer having an elongated shape transversely with respect to the electrode on which said element is placed and a width exceeding that of the gap separating two electrodes and facing the electrode part on which said element is located. The element is made from an electrically isotropic material and each element preventing the light passing through the screen without permitting the spacing of the plates being formed by an opaque layer covering the electrode part on which said latter element is placed. The optically isotropic material can be an optically isotropic, photosensitive resin. The said material can be transparent or opaque.

In a particular realization of the screen according to the invention, said plates are also covered with orientation layers of the liquid crystal, which are made anisotropic in a direction parallel to the electrodes of one of the two electrode groups, the elements permitting the spacing of the plates being located on the electrodes of said group.

The zigzag defects are parallel to the direction of the spacers, which is understood to mean the direction parallel to the length of said spacers and in such a case it is preferable for the width of the spacers to be less and preferably very considerably less than that of the inter-electrode gap relative to the other group of electrodes, so that the zigzag defects can be forced into the non-switchable area of the screen.

In another preferred realization, said plates are also covered with orientation layers of the liquid crystal which are made anisotropic in a direction parallel to the electrodes of one of the two groups of electrodes, the elements permitting the spacing of the plates being placed on the electrodes of the other group.

The zigzag defects are then perpendicular to the direction of the spacers and in such a case it is preferable for the length of each spacer to be substantially equal to the width of the electrode carrying said spacer, in order to confine the zigzag defects in the non-switchable area of the screen, whereas in the previously considered case, said length can be equal to or less than said electrode width. However, in general terms, it is preferable for said spacer length to be approximately the same as the electrode width in order to obtain a rigid screen. Moreover, in the case considered hereinbefore leading to defects perpendicular to the direction of the spacers, the width of said spacers is equal to or less than that of the corresponding opaque layers.

Each opaque layer can advantageously be an opaque metal layer. Thus, the metal layers are opaque with limited thicknesses compatible with the limited thickness of the liquid crystal used in the present invention. Thus, it is possible to use a chromium or chrome layer, which can have a thickness between approximately 30 and approximately 200 nm.

As has already been stated, the liquid crystal can be chosen in the group including tilted chiral smectic C,I,F,G and H liquid crystals.

The present invention also relates to a process for obtaining elements constituting spacers of the special type referred to hereinbefore, in which the spacers are located on opaque layers, said process being characterized in that it comprises a deposition of a positive photosensitive resin layer on the plate carrying the electrodes and the opaque layers on which the spacers will be located, an irradiation of the resin through said plate arranged in such a way that the opaque layers carried by the plate serve as a mask during irradiation and an elimination of the irradiated resin.

Finally, the invention also relates to a process for the treatment of the screen according to the invention, which is characterized in that it comprises the application, between the row electrodes and the column electrodes, of an alternating current voltage, whilst maintaining the screen at a temperature close to the transition temperature of the ferroelectric smectic phase to the immediately higher phase (from the temperature standpoint) of the liquid crystal, so as to localize the zigzag defects of the liquid crystals in the vicinity of or in the non-switchable area of the screen.

It is also possible to localize the defects by operating the screen continuously for a sufficiently long time by applying an alternating current voltage between the row electrodes and the column electrodes, as stated hereinbefore.

BRIEF DESCRIPTION OF THE DRAWING

The invention is described in greater detail hereinafter relative to non-limitative embodiments and the attached drawings, wherein:

FIGS. 7 and 7A are partial, diagrammatic views of other embodiments of screens according to the invention;

FIGS. 8A to 8E are partial diagrammatic views of various stages of a process for producing a screen according to the invention;

FIG. 9 is a partial diagrammatic view of a variation in one stage of the performance of said process;

DESCRIPTION OF THE PREFERRED EMBODIMENT

Figure 1:
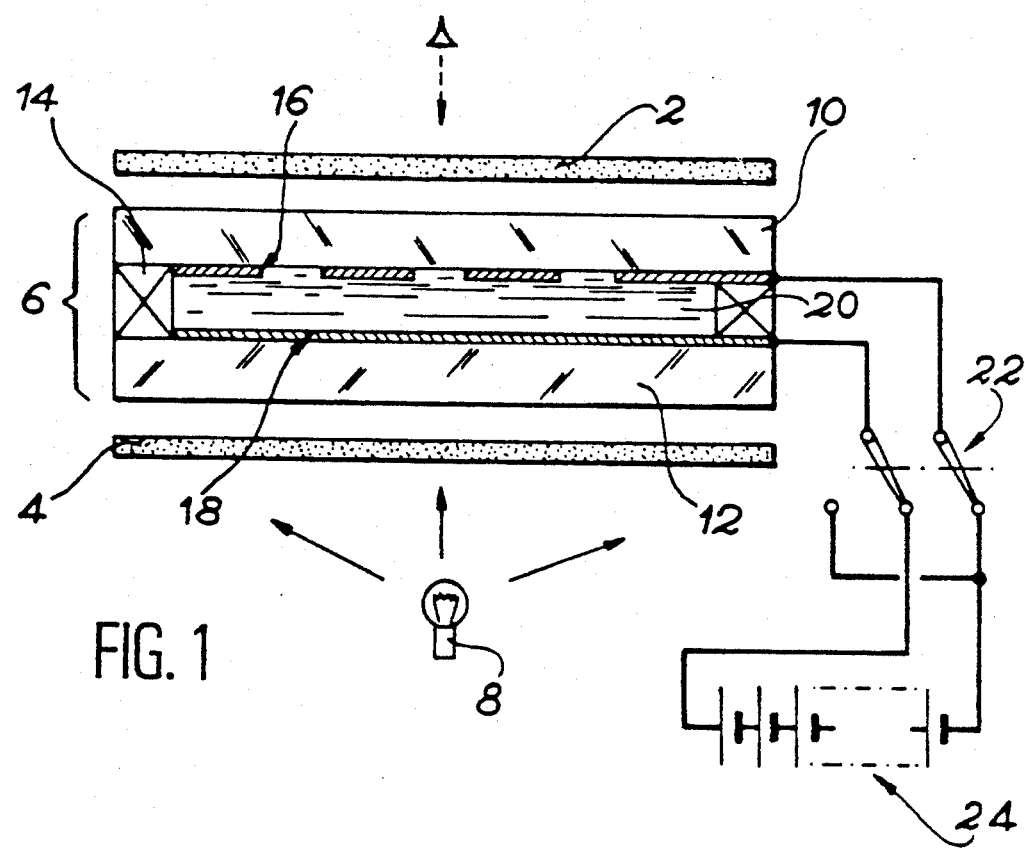
FIG. 1, already described is, a diagrammatic view of a display means using a chiral smectic C phase liquid crystal.
Figure 2:
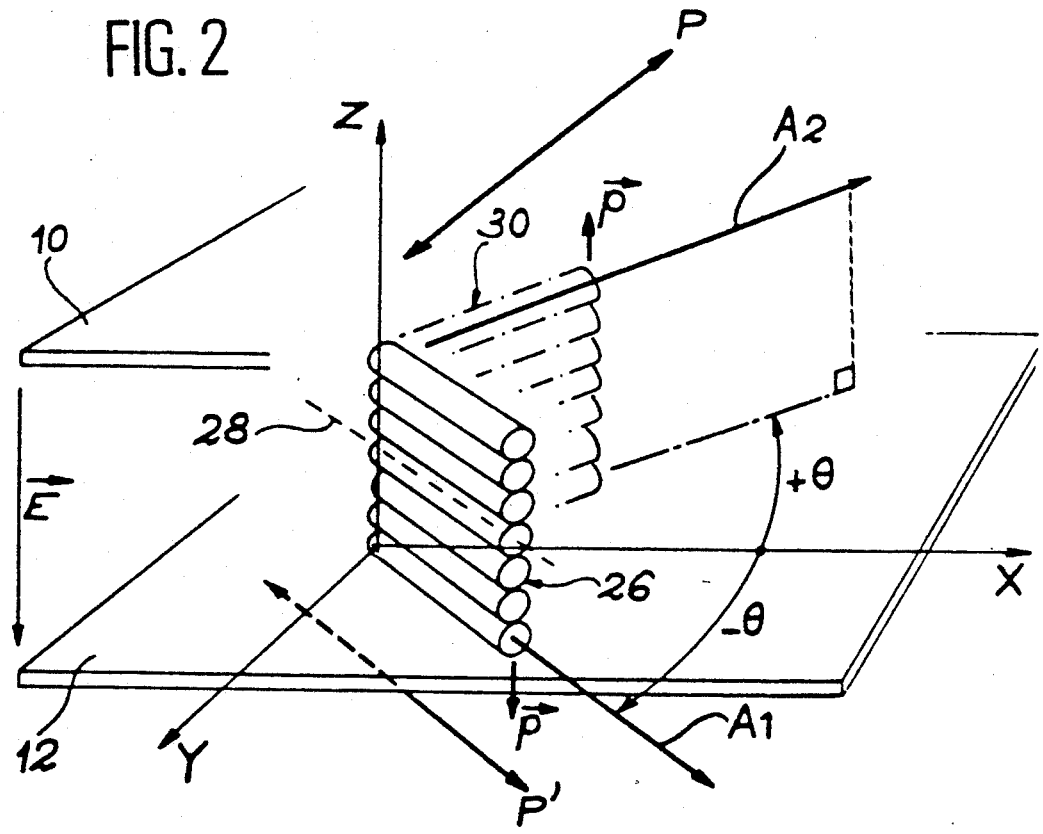
FIG. 2, already described, shows the molecular orientation of said liquid crystal in the display means.
Figure 3:
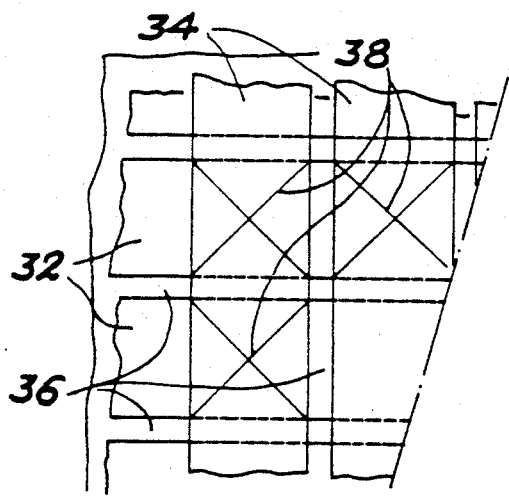
FIG. 3, already described, is a diagrammatic view of the row electrodes and column electrodes of a liquid crystal display screen.
Figure 4:
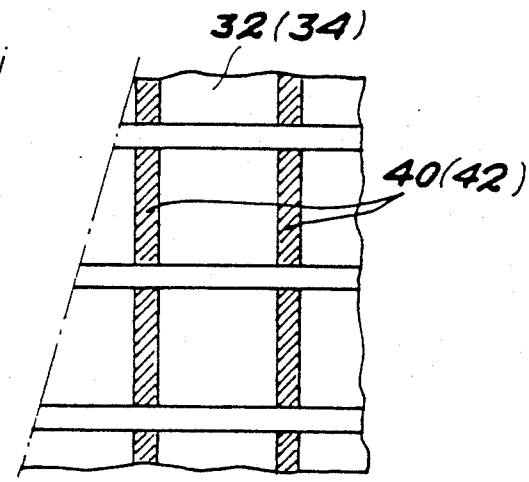
FIGS. 4 and 5 are partial, diagrammatic views of a display screen according to the invention.

FIG. 4 partially and diagrammatically illustrates a special embodiment of the invention. A layer 40 or 42 of an opaque material having a thickness compatible with that of the ferroelectric liquid crystal layer used is formed on each row electrode 32 or column electrode 34 in the form of a strip (cf. FIG. 3), facing each of the gaps separating the column or row electrodes.

For this purpose use is e.g. made of a chromium layer having a thickness of a few dozen nanometres, which is sufficient to make this layer opaque. The chromium layer is etched so as to only leave on electrodes 32,34 and more specifically on those parts thereof facing the gaps in question a succession of rectangular patterns, whose width is equal to or preferably greater than that of the gap between two column electrodes or row electrodes and whose length is equal to the width of the row or column electrodes.

The gap between two patterns corresponding to the row or column electrodes is equal to or preferably less than the width of the column or row electrodes.

The relative positioning of the glass plates 44,46 respectively carrying the row electrodes and column electrodes then makes it possible to make these patterns optically cover most of the non-switchable area. The patterns produced on the row or column electrodes face the gaps separating the column or row electrodes.

Figure 5:
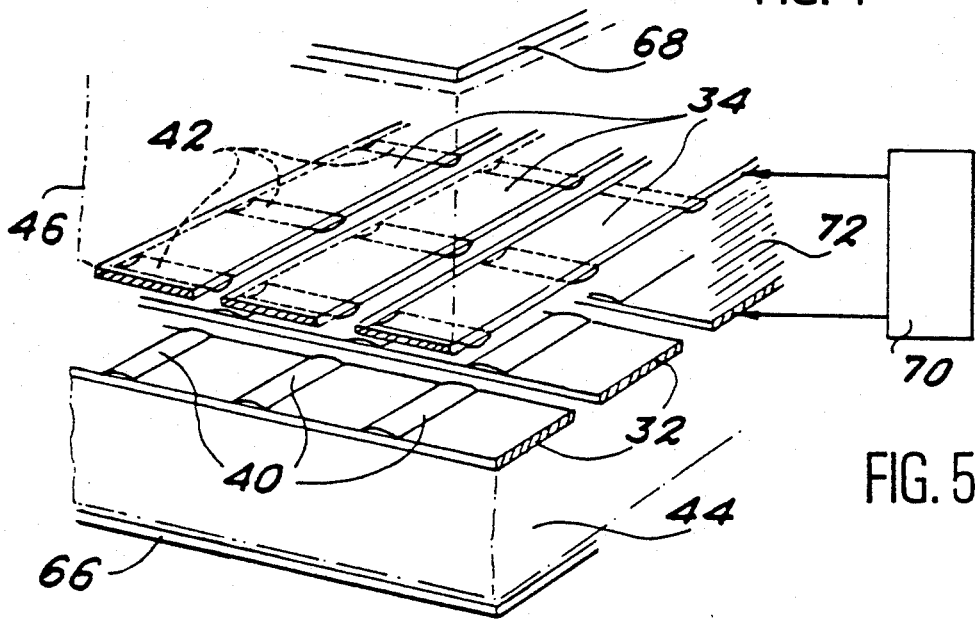
Figure 6:
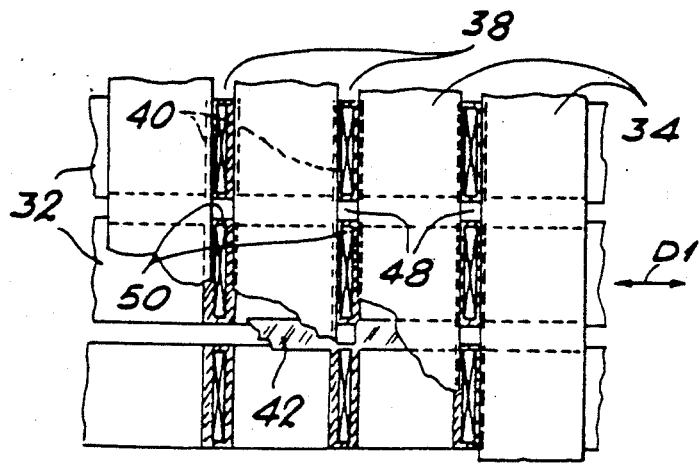
FIG. 6 is a plan view of part of the screen shown in FIG. 5.

This is visible in perspective in FIG. 5 and in plan view in FIG. 6. The only non-switchable and non-opaque regions left are the portions 48 of the non-switchable area corresponding to the "intersections" (in plan view) of the row inter-electrode gaps and the column inter-electrode gaps.

The provision of a minimum inter-electrode gap, whilst taking account of the production process described hereinafter, makes it possible to minimize these non-switchable and non-opaque parts.

In order to obviate the disadvantage associated with the zigzag defects relative to the ferroelectric liquid crystals, use is made of the non-switchable area rendered opaque when attempting to localize the defects in or in the vicinity of said area.

To this end, use is e.g. made of hitherto unknown property, namely an alternating voltage applied between the row electrodes and the column electrodes at a temperature close to the transition temperature from the ferroelectric smectic phase to the immediately higher phase (with respect to temperature) of the liquid crystal, which displaces the zigzag defects which are then localized in the non-switchable area, which is not subject to the alternating electric field resulting from the alternating voltage. For example for a tilted chiral smectic C liquid crystal, the latter is heated to a temperature close to the transition temperature from phase C to phase A of said liquid crystal.

The migration of a zigzag defect (generally in the form of a line) is stopped through its encountering dust or a spacer. As has been stated, the use of plastic balls as spacers distributed in a random manner on a pixel is disadvantageous.

The discovered property is then used in the following way. Elements so such as spots of photosensitive resin serving as spacers are formed in the non-switchable area 36 of the screen, which has been made opaque (FIG. 6). In this way, the switchable area of the screen has no spacer liable to impede the migration of the defects. These spacers are respectively disposed either on opaque patterns located on the row electrodes (FIG. 6), or on the opaque patterns located on the column electrodes (FIG. 7, where the spacers carry reference 52). Each spacer is shaped like a parallelepipedic block, whose width can be less, e.g. half that of the inter-electrode gap facing the same, i.e. the gap separating two column or row electrodes if the spacers are on the row or column electrodes. The block length is equal to or less than the width of the electrode on which it is located.

Moreover, as plates 44 and 46 (FIG. 5) are provided with orientation layers of the liquid crystal (not shown in FIGS. 5 to 7A), it is known that it is necessary to give to said orientation layers an anisotropy direction, e.g. by rubbing. However, the defects are placed perpendicular to said anisotropy direction (which can either be parallel to the row electrodes, or parallel to the column electrodes). It is therefore possible to orient the spacers, in their length direction, perpendicular to the rubbing direction D1 (FIG. 6) and give them a width less than that of the corresponding opaque patterns (which is the case for the screen of FIG. 6), so that the zigzag defects, which are then parallel to the spacers, can be blocked in the non-switchable area, the length of the spacers being equal to or less than the width of the electrodes on which they are placed.

Conversely, it is possible to orient the spacers parallel to the rubbing direction provided (FIG. 7, where said direction carries reference D2) and give them a length equal to the width of the electrodes on which they are located (the column electrodes in FIG. 7), so that the zigzag defect ZZ, which are then perpendicular to the spacers, can be blocked in the non-switchable area of the screen, the width of the spacers then being either equal to the width of the opaque material, or less than said width and in tho latter case it is preferably either less, or more than the width of the facing inter-electrode gap.

FIG. 7A shows an embodiment of the invention identical to that of FIG. 7, except that the width of each spacer is greater than that of the facing inter-electrode gap.

Various embodiments of a screen according to the invention will be referred to hereinafter in describing the process.

The first stage is to form on each glass plate 44,46 a layer 54 of indium and tin oxide (ITO), which is transparent, followed by the deposition on said layer 54, by vacuum evaporation, of a chromium layer 56, e.g. having a thickness of 50 nanometers (FIG. 8A).

Over said chromium layer 56 is then spread a positive photosensitive resin layer 58, whose thickness is equal to that provided for the spacers, i.e. a thickness between approximately 1.5 and 2 micrometers for tilted chiral smectic C liquid crystals (FIG. 8B).

This is followed by a first irradiation of the resin through the mask used for the definition of the row electrodes 32 or column electrodes 34, followed by the development of the resin and the etching of the chrome 56 and ITO 54 layers, which defines the row electrodes 32 or column electrodes 34 coated with the chromium layer (FIG. 8C).

This is followed by a second irradiation of the resin through an appropriate mask, in order to define chromium patterns 40 or 42, followed by the development of the resin and the elimination by etching of the residual chromium not protected by the resin (FIG. 8D), in such a way that what is left consists of the row or column electrodes provided with chromium patterns corresponding thereto and which are surmounted by a calibrated resin layer, said patterns having a width which is at least equal to the column or row inter-electrode gap.

Then, for plate 44 carrying the row electrodes, the resin is annealed at 200° C. for approximately one hour, in such a way that the spacers 50 produced by these resin layers do not undergo deformation. With regards to the plate 46 carrying the column electrodes, its resin is removed (in order not to prevent the subsequent introduction of the liquid crystal between the joined plates 44,46).

It would obviously also be possible to anneal the resin of plate 46 in order to harden the spacers 52 produced and remove the resin from plate 44.

In a variant relative to the glass plate on which it is wished to produce the spacers, in order to avoid deterioration of the resin as a result of all the etching stages, said resin is removed following the stage involving the second irradiation of the resin, its development and etching permitting the definition of chromium patterns (FIG. 8D), after which a positive resin layer 60 is spread out, whose thickness is calibrated and corresponds to that intended for the spacers (FIG. 9). Layer 60 is irradiated through the glass plate in question, so that the chromium patterns serve as a mask (FIG. 9). The resin is then developed and annealed for one hour at 200° C.

This leads to "self-aligned" spacers on the glass plate in question.

In the examples relative to FIGS. 8A to 8D and 9, each spacer covers all the corresponding chromium pattern 40 or 42. With such spacers and in the case where the rubbing direction is perpendicular to the latter, the defects in the form of lines are localized on the edge of the pixels (after e.g. heating applying the voltage referred to hereinbefore), which is only slightly disturbing from the visual standpoint. However, it is possible to completely locate the defects in the non-switchable area by producing spacers, each of which occupies a smaller surface (FIG. 6), each spacer, seen in section parallel to plates 44,46, e.g. being shaped like a rectangle, whose width is less than the length and the width of the corresponding pattern. For this purpose use is made of an appropriate supplementary mask for irradiating the resin layer 60 or 50 (52).

Once the spacers have been produced, orientation layers are e.g. obtained in the following way. In vapour phase on the face of each plate 44,46 carrying the electrodes is deposited an e.g. 60 nanometer thick silica layer 62 and on the latter is formed a nylon $6^{(R)}$ or polyamide 6 alignment layer 64, e.g. with a thickness of 150 nanometers in a way known from the prior art. This layer 64 is then annealed for one hour at 120° C., then rubbed in a direction parallel or perpendicular to the electrodes on which the spacers are located and in one and/or the other sense relative to said direction.

A glue joint serving as a seal is then deposited by screen process printing on one of the plates. Following the assembly of the plates, heating takes place to e.g. 160° C. for two hours in order to permit the polymerization of the glue and then in known manner the space between plates 44 and 46 is filled with an appropriate liquid crystal.

Considering, for example, the case of a titled chiral smectic C liquid crystal, the screen is then heated to 120° C. and therefore so is the liquid crystal, in order that the latter is in its isotropic phase and at this temperature an alternating voltage of approximately 30 V is applied between each row electrode and each column electrode in order to bring the zigzag defects into the vicinity of the spacers.

By way of example, and not as a limitation on the resin that may be used, is a resin marketed by Shipley under reference 1350J. It is developed with the Microposit 351 developer of the same company. The chromium is etched with the aid of an etched Cr solution marketed by Soprelec. The indium and tin oxide is etched by a solution containing two volumes of hydrochloric acid per volume of ferric chloride.

The liquid crystal is e.g. either mixture A referred to hereinafter, or mixture A doped with 0 to 35% by volume of compound B, which is also referred to hereinafter.

The linear polarizers 66 and 68 (FIG. 5) are then put into place on either side of the sealed cell obtained, in such a way that their respective polarization directions are perpendicular and the polarizer encountered first by the light making it possible to illuminate the screen has its polarization direction parallel to one of the two orientation directions A1 or A2 of the ferroelectric liquid crystal molecules.

FIG. 5 also shows conventional control means 70 for the row electrodes and the column electrodes, whilst the liquid crystal layer is designated 72.

By volume, mixture A is constituted by:

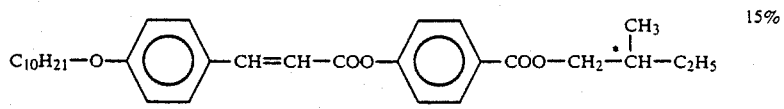

15%

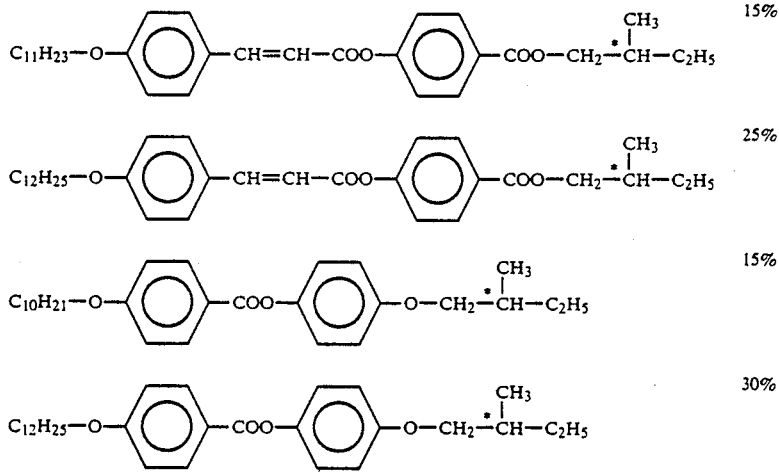

15%

25%

15%

30%

Compound B is of formula:

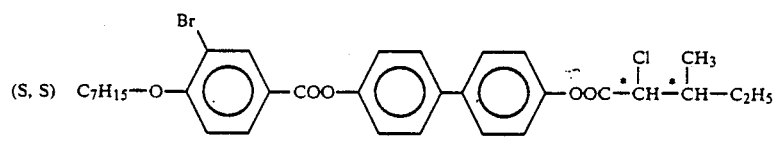

The process for producing 4-(4-heptyloxy-3-bromo-benzoyloxy)-4'-((2S, 3S)-3-methyl-2-chloro-pentanoyloxy)-biphenyl (Compound B) is given hereinafter:

a) Synthesis of the substituted phenol necessary for obtaining B, which is a biphenyl ester. This phenol is 4-(4-heptyloxy-3-bromobenzoyloxy)-biphenyl-4'-ol of formula:

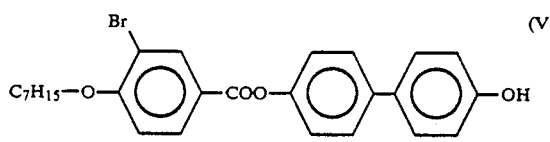

and is obtained according to the following reaction diagram:

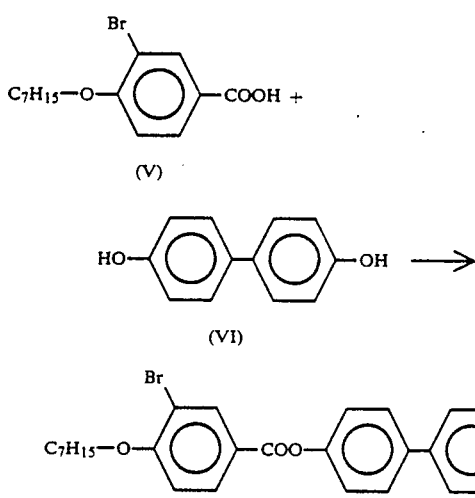

To a 10 ml Erlenmeyer flask are added 205 mg of 4-heptyloxy-3-bromo-benzoic acid of formula (V), 0.7 ml of thionyl chloride ($SOCL_2$) and 2.2 ml of benzene.

The solution is refluxed for 4 hours. The excess thionyl chloride and benzene are distilled under reduced pressure. To the crude acid chloride obtained are added 145 mg of 4,4'-dihydroxybiphenyl of formula (VI) in 3 ml of pyridine. The solution is stirred for two days with very slight heating. The cooled solution is then acidified with a 10% by volume HCL solution in water and extracted 3 times with ether (30 ml).

The organic phases obtained are washed with aqueous solutions:
3×25 ml of $H_2O$-10% by volume HCL,
3×25 ml of 5% by weight $NaHCO_3$,
3×25 ml of 10% by weight NaOH,
3×25 ml of 10% by volume HCL,
2×25 ml of saturated NaCL.

The organic phases are then collected, dried on sodium sulphate and evaporated.

The washed organic mixture on silica then undergoes chromatography with as the eluent a chloroform-ether mixture with a volume composition of 80-20%. 74 mg of 4-(4-heptyloxy-3-bromo-benzoyloxy)-biphenyl-4'-ol are obtained. The reaction yield is 23%.

The characteristics of the product obtained are in the infrared on OH band at 3470 nm and a C=O band at 1715 nm, the break point is 186° C. and the chromatography coefficient Rf is equal to 0.7.

Synthesis of 4-(-4-heptyloxy-3-bromo-benzoyloxy)-4'-((2S, 3S)-3-methyl-2-chloropentanoyloxy)-biphenyl by reaction of the phenol (VII) obtained in a) with an optically active acid according the reaction diagram:

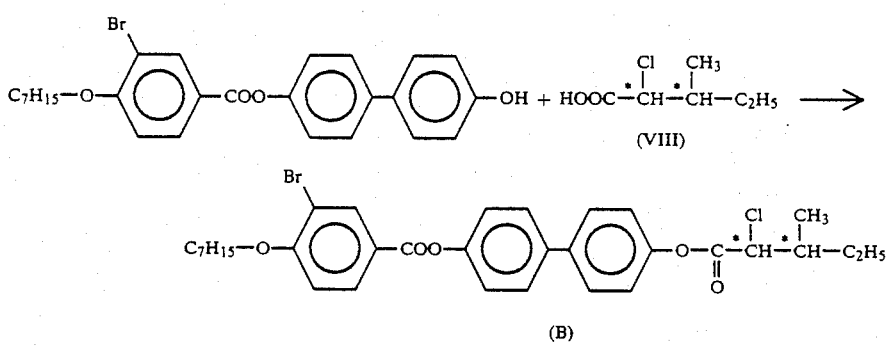

(B)

27.3 mg of (2S,3S)-3-methyl-2-chloropentanoic acid of formula (VIII), 58.7 mg of 4-(4-heptyloxy-3-bromobenzoyloxy)-biphenyl-4'-ol, 26 mg of N, N'-dicyclohexylcarbodiimide of formula $C_6H_{11}$—N=C=N—$C_6H_{11}$, 2.2. mg of 4-pyrrolidinopyridine of formula $C_4H_8N$—$C_5H_4N$ and 2 ml of methylene chloride of formula $CH_2Cl_2$ in dry form are stirred at ambient temperature for at least 12 hours. The precipitate obtained is filtered. The solution is taken up in 25 ml of methylene chloride and washed with 3×15 ml of $H_2O$, 3×15 ml of 5% acetic acid in water, 2×15 ml of a saturated sodium chloride solution in water.

The aqueous phases are taken up twice with 25 ml of methylene chloride.

The organic phases are collected and dried on sodium sulphate and then evaporated on the rotovapour. The solid obtained undergoes chromatography on 25 g of silica with as the eluent $CH_2Cl_2$-petroleum ether in a percent by volume ratio of 60:40. This gives 58 mg of a white product, which is recrystallized in petroleum ether.

The transition temperatures of the end product are:

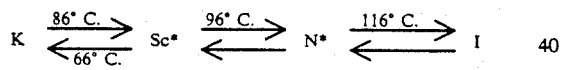

K representing the solid state, Sc a smectic C structure, * a chiral structure, N a nematic structure and I an isotropic structure.

Figure 10A:
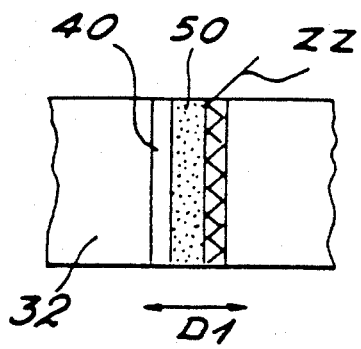
FIGS. 10A and 10B are partial diagrammatic views of a screen constructed according to the invention.
Figure 10B:
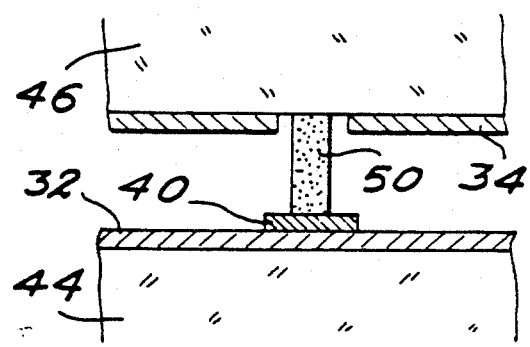

Another example of a screen according to the invention is diagrammatically and partly shown in FIGS. 10A (in plan view) and 10B (in section). The spacers are located on the row electrodes 32 and the rubbing direction D1 is parallel to said electrodes. The electrodes are of ITO and have a width of 300 micrometers. The opaque patterns are of chromium, have a thickness of 100 nanometers and a width of 60 micrometers, whereas the gaps between the column electrodes only have a width of 40 micrometers. Each spacer surmounting a chromium pattern is of photosensitive resin, has a width of 20 micrometers, a length of 300 micrometers and a height of 1.6 micrometer.

Figure 11:
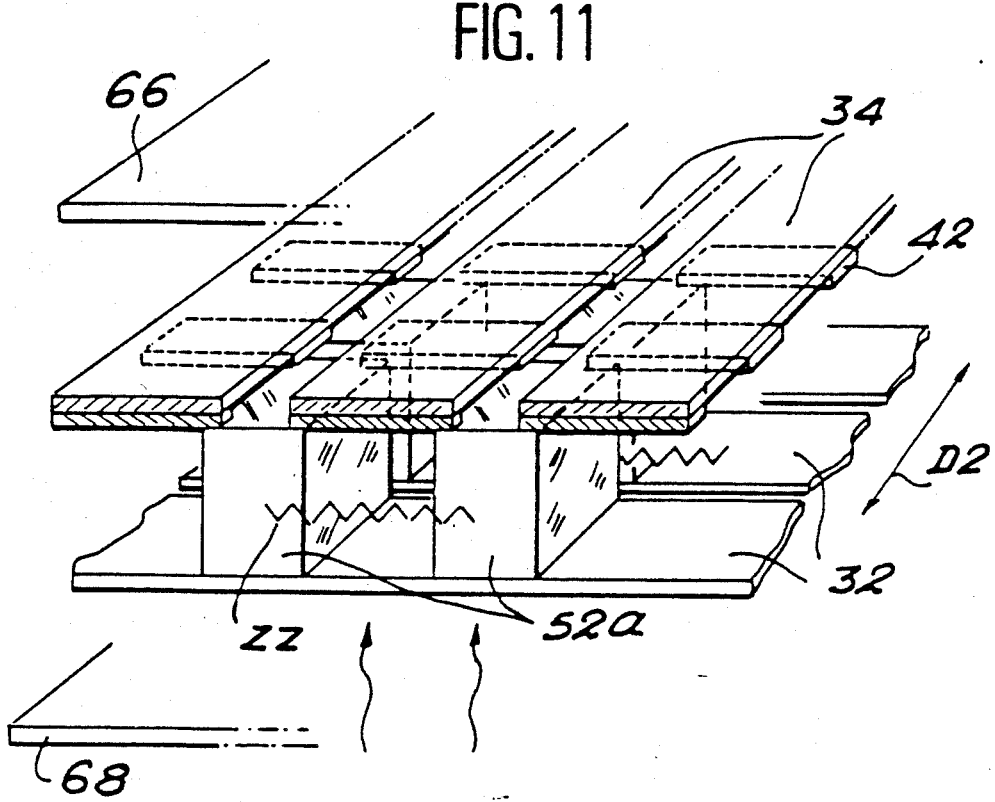
FIG. 11 is a partial diagrammatic view showing another screen constructed according to the invention.

Another embodiment is diagrammatically and partly shown in perspective in FIG. 11. The opaque chromium patterns carry no spacer and are all placed on the electrodes of the same electrode group (either the row or column electrodes) and the electrically insulating spacers 52a are carried directly by the electrodes of the other group. In the case of FIG. 11, the chromium patterns are carried by the column electrodes and the spacers by the row electrodes. The rubbing direction D2 is parallel to the spacers, whose length is equal to the width of the electrodes carrying them, so as to be able to confine the zigzag defects ZZ to the non-switchable area. The spacers can be opaque or transparent and have a width greater than that of the facing interelectrode gap. They must be optically isotropic, so that even if they are transparent, they cooperate with the crossed linear polarizers 66,68 equipping the screen of FIG. 11, in order to stop light striking the screen in the direction of the spacers.

In the embodiment shown in FIG. 11, the electrodes are 300 micrometers wide and the interelectrode gap is 40 micrometers wide. The chromium patterns are 0.1 micrometer thick and have a width of 60 micrometers. Spacers 52a are of photosensitive resin, have a thickness of 1.5 micrometer, a length equal to the width of the electrodes carrying them and a width of 60 micrometers.

We claim:

1. In a ferroelectric liquid crystal screen assembly comprising:
    two opposed spaced apart transparent electrically insulating plates (44, 46) each having an outer side and an inner side;
    a group of transparent row electrodes (32), arranged in spaced parallel relation to one another to define gaps therebetween, and an opposing group of transparent column electrodes (34), arranged in spaced parallel relation to one another to define gaps therebetween and crossing perpendicularly to said row electrodes with said electrodes each having parts thereof facing said gaps in an opposing group, said electrode groups being respectively located on said inner sides of said two electrically insulating and transparent plates and separated by a liquid crystal layer space therebetween with the intersections of said gaps defining non-switchable areas of said screen; and
    a ferroelectric liquid crystal layer (72) able to have zigzag faults located in said space between said group of transparent row electrodes and said group of transparent column electrodes;
  the improvement comprising:
    an element (40, 50–42, 52–52a) impervious to light located on said parts of each row electrode facing a gap separating two column electrodes, and on said parts of each column electrode facing a gap separating two row electrodes;
    and wherein either the elements which are located on said row electrodes or the elements which are located on said column electrodes have a dimension in a direction normal to said row electrodes and said column electrodes to space the plates apart to create said liquid crystal layer space and are electrically insulating to prevent any electrical connection between said row electrodes and said column electrodes, and have a longitudinal dimension parallel to said gaps to cause said zigzag defects to localize only in the vicinity of said non-switchable areas of the screen, or in said non-switchable areas.

2. The screen according to claim 1, wherein each of said elements includes an opaque layer (40, 42), which covers the electrode part on which said element is placed and wherein each element causing the spacing of the plates, apart from said opaque layer, has an electrically insulating spacer material (50, 52) placed on said opaque layer.

3. The screen according to claim 2, wherein said opaque layer has a width that is greater than the width of the gap separating two electrodes and facing the part covered by said opaque layer.

4. The screen according to claim 2, wherein each spacer material is elongated transversely with respect to the electrode on which each spacer material is placed.

5. The screen according to claim 4, wherein said spacer material has a width that exceeds the width of the gap separating two electrodes and facing the part on which the element having said spacer is placed.

6. The screen according to claim 4, wherein each spacer material has a width that is less than the width of the gap separating two electrodes and facing the part on which the element having said spacer is placed.

7. The screen according to claim 2, wherein the length of each spacer material is substantially equal to the width of the electrode carrying said spacer material.

8. The screen according to claim 2, wherein said opaque layer of said element is an opaque metal layer.

9. The screen according to claim 1, wherein:
said screen further includes two crossed linear polarizers (66, 68) on said outer sides of said plates;
each element causing the spacing of the plates is an electrically insulating spacer made of an optically isotropic material and has an elongated shape extending transverse to the electrode on which said element causing the spacing of the plates is arranged and a width greater than the width of the gap separating two parallel electrodes of a group; and
each element which is impervious to light but which is not an element causing the spacing of the plates, includes an opaque layer covering the electrode part on which said element is placed.

10. The screen according to claim 9, wherein said optically isotropic material is an optically isotropic photosensitive resin.

11. The screen according to claim 1 wherein said inner sides of said plates each have liquid crystal orientation layers (62) rendered anisotropic in a direction (D1) parallel to the electrodes of one of the two electrode groups, and wherein said elements causing the spacing of the plates are arranged on the electrodes of said one of the two electrode groups.

12. The screen according to claim 1, wherein said inner sides of said plates each have liquid crystal orientation layers (62) rendered anisotropic in a direction (D2) parallel to the electrodes of one of the two electrode groups, and wherein said elements permitting the spacing of the plates are located on the electrodes of the other of the two groups.

13. The screen according to claim 1, wherein said ferroelectric liquid crystal is chosen from the group including tilted chiral smectic C,I,F,G and H liquid crystals.

14. A process for making a ferroelectric liquid crystal screen comprising the steps of:
using two transparent electrically insulating plates (44, 46) each having an outer side and an inner side;
forming a group of transparent row electrodes (32) on the inner side of one of the plates, said row electrodes being arranged in spaced parallel relation to one another to define gaps therebetween, forming an opposing group of transparent column electrodes (34) on the inner side of the other plate, said column electrodes being arranged in spaced parallel relation to one another to define gaps therebetween and crossing perpendicularly to said row electrodes with said electrodes each having parts thereof facing said gaps in said opposing group with the intersections of said gaps defining non-switchable areas of said screen, and separating said plates having said electrode groups by a liquid crystal layer space therebetween;
forming an opaque layer (40, 42) on said parts of each row electrode facing a gap separating two column electrodes, and on said parts of each column electrode facing a gap separating two row electrodes;
forming an electrically insulating spacer material either on the opaque layers which are located on said row electrodes or on the opaque layers which are located on said column electrodes, said spacer material having a dimension in a direction normal to said row electrodes and said column electrodes that will space the plates apart to create said liquid crystal layer space and prevent any electrical connection between said row electrodes and said column electrodes;
placing a ferroelectric liquid crystal layer (72) able to have zigzag faults in said liquid crystal layer space between said group of transparent row electrodes and said group of transparent column electrodes; and
said spacer material having a longitudinal dimension parallel to said gaps to cause said zigzag defects to localize only in the vinicity of said non-switchable areas of the screen, or in said non-switchable areas.

15. A process according to claim 14 wherein, for forming said spacer material, said process comprises the steps of:
depositing a positive photosensitive resin layer on said opaque layers of one of the plates;
positioning said one of the plates so that said opaque layers carried by said one of the plates serve as a mask during a subsequent irradiation step;
irradiating said resin layer through said one of the plates; and
removing said irradiated resin from said one of the plates.

16. A process for making a ferroelectric liquid crystal screen comprising the steps of:
using two opposed transparent electrically insulating plates (44, 46) each having an outer side and an inner side;
forming a group of transparent row electrodes (32) on the inner side of one of the plates, said row electrodes being arranged in spaced parallel relation to one another to define gaps therebetween, forming an opposing group of transparent column electrodes (34) on the inner side of the other plate, said column electrodes being arranged in spaced parallel relation to one another to define gaps therebetween and crossing perpendicularly to said row electrodes with said electrodes each having parts thereof facing said gaps in said opposing group with the intersections of said gaps defining non-switchables areas of said screen, and separating said plates having said electrode groups by a liquid crystal layer space therebetween;

placing elements (40, 50-42, 52-52a) impervious to light on said parts of each row electrode facing a gap separating two column electrodes, and on said parts of each column electrode facing a gap separating two row electrodes;

forming either the elements which are located on said row electrodes or the elements which are located on said column electrodes to have a dimension in a direction normal to said row electrodes and said column electrodes that will space the plates apart to create said liquid crystal layer space and be electrically insulating to prevent any electrical connection between said row electrodes and said column electrodes;

placing a ferroelectric liquid crystal layer (72) able to have zigzag faults, in said liquid crystal layer space between said group of transparent row electrodes and said group of transparent column electrodes;

said formed elements having a longitudinal dimension parallel to said gaps to cause said zigzag defects to localize only in the vicinity of said non-switchable areas of the screen, or in said non-switchable areas;

heating said screen to a temperature close to the transition temperature from the ferroelectric smectic phase to the immediately higher phase of the liquid crystal; and while maintaining said screen at said temperature, applying an alternating current voltage between said row electrodes and said column electrodes until said zigzag defects of the liquid crystal are localized in the vicinity of or in said non-switchable area.

* * * * *